April 5, 1960

D. C. ERDMAN 2,931,978

METHODS AND APPARATUS FOR MEASURING
WAVE PROPAGATION TIME

Filed July 18, 1955

INVENTOR.
DONALD C. ERDMAN

BY

Christie, Parker & Hale
ATTORNEYS

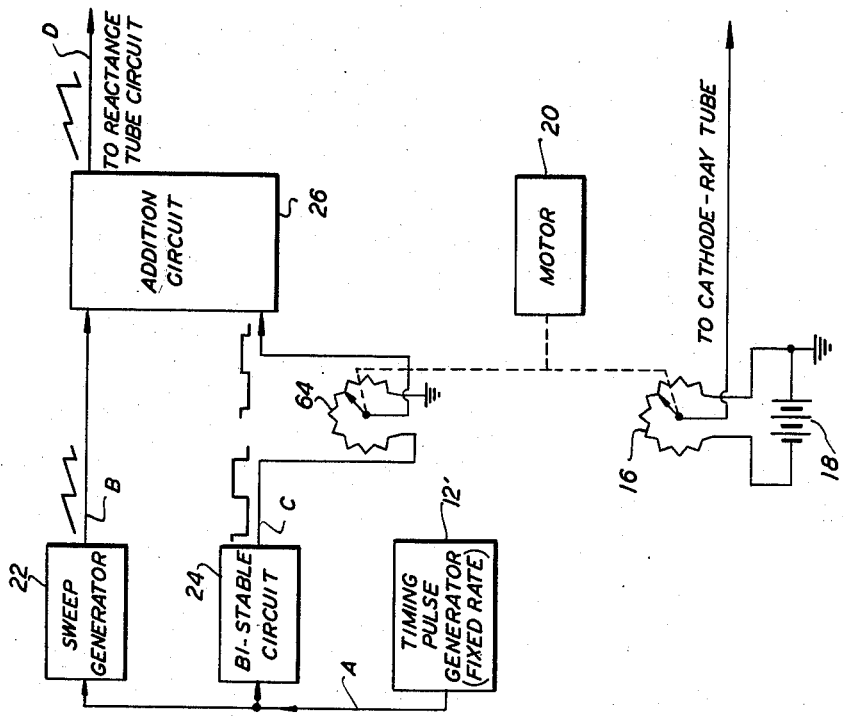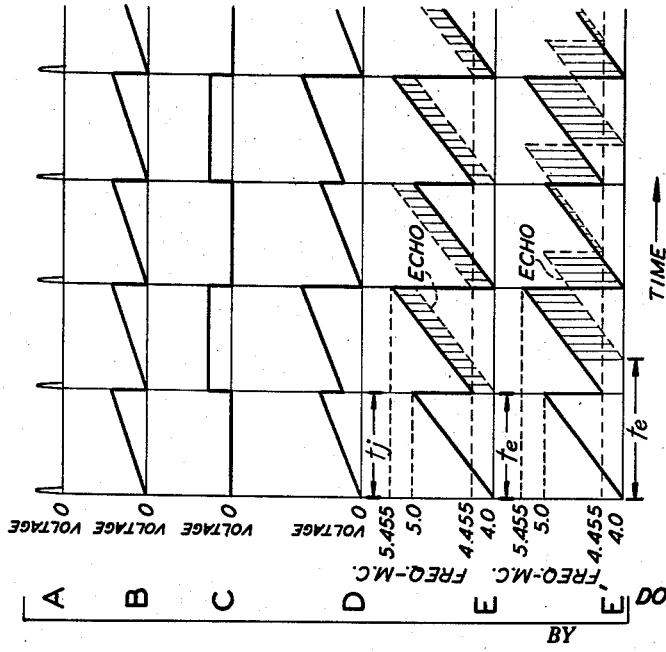

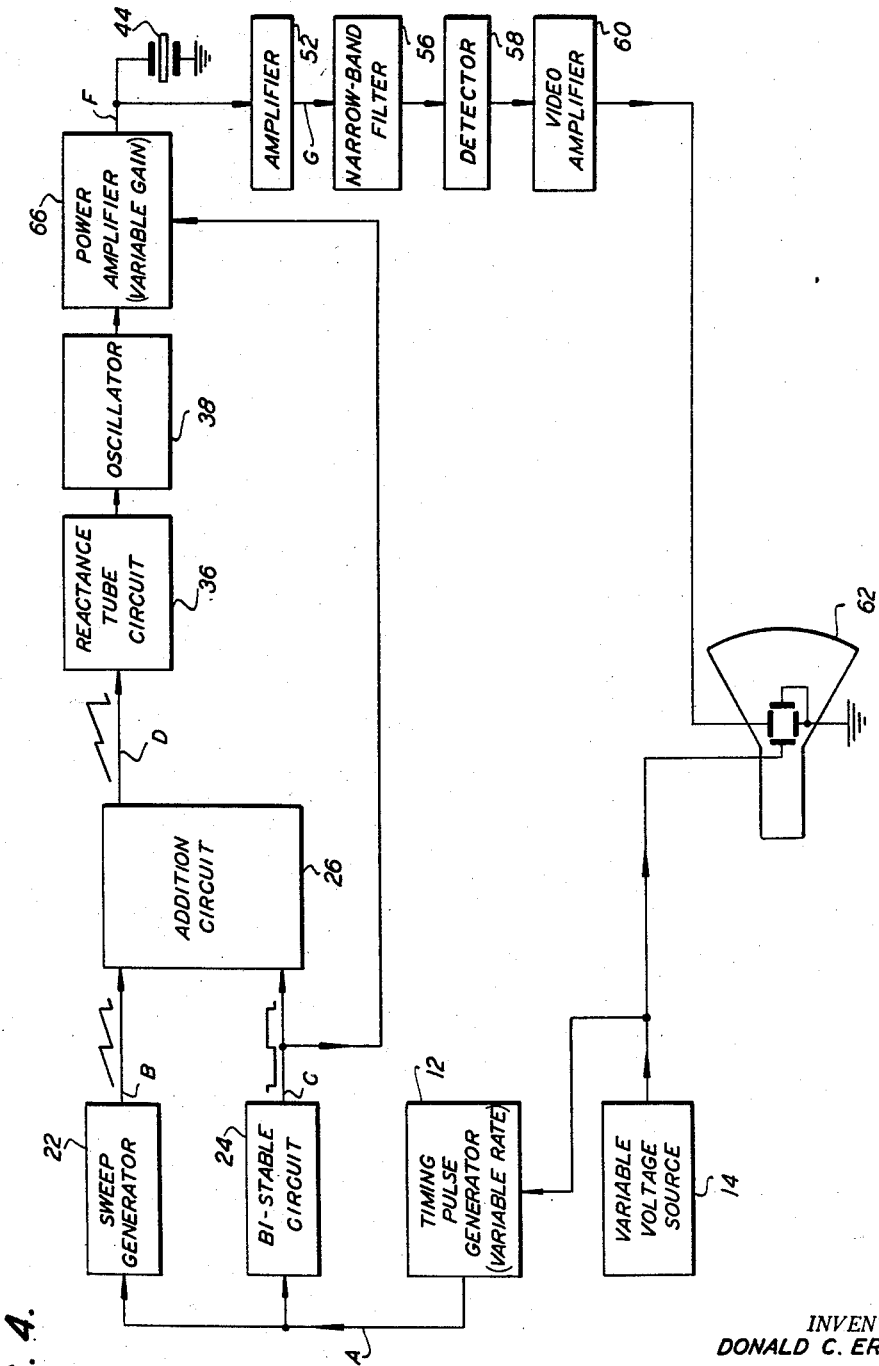

April 5, 1960

D. C. ERDMAN 2,931,978

METHODS AND APPARATUS FOR MEASURING
WAVE PROPAGATION TIME

Filed July 18, 1955

INVENTOR.
DONALD C. ERDMAN

BY

Christie, Parker & Hale

ATTORNEYS

INVENTOR.
DONALD C. ERDMAN
BY
Christie, Parker & Hale
ATTORNEYS

INVENTOR.
DONALD C. ERDMAN

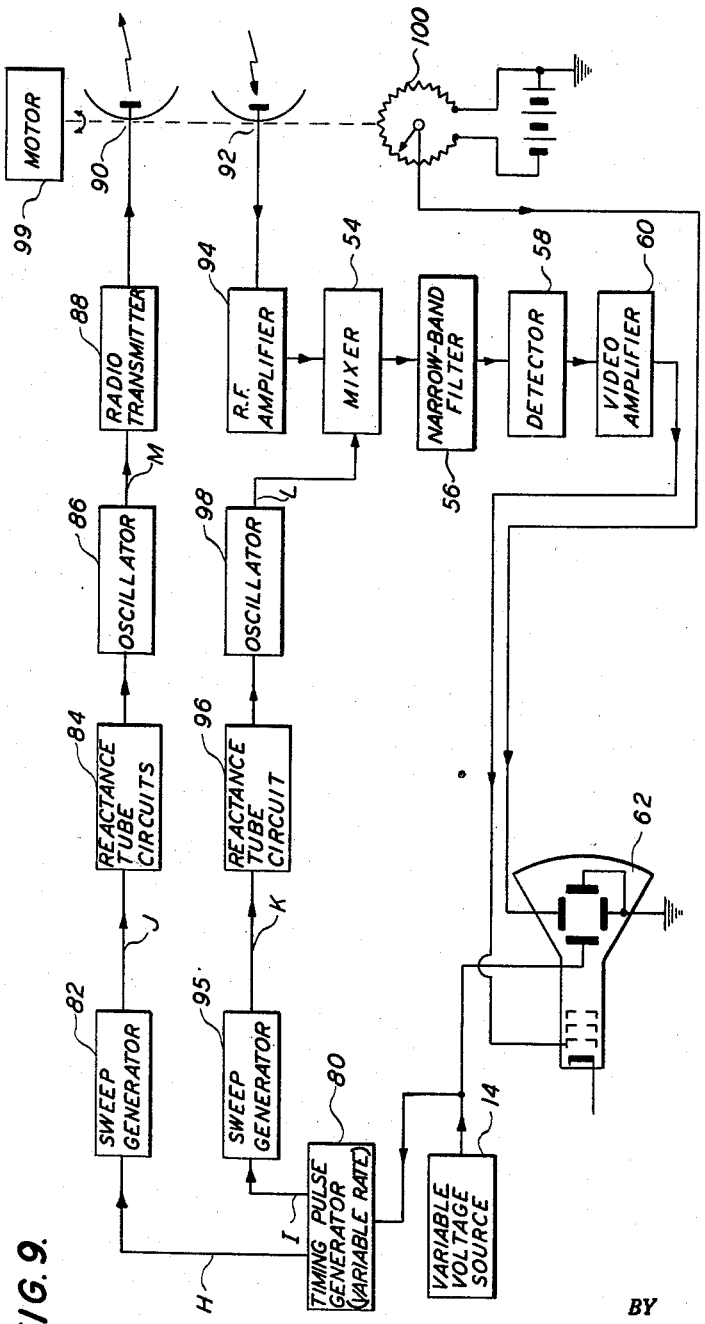

United States Patent Office 2,931,978
Patented Apr. 5, 1960

2,931,978
METHODS AND APPARATUS FOR MEASURING WAVE PROPAGATION TIME

Donald C. Erdman, Pasadena, Calif., assignor to Electrocircuits Incorporated, Pasadena, Calif., a corporation of California Application July 18, 1955, Serial No. 522,542

9 Claims. (Cl. 324—68)

This invention relates to improvements in methods and apparatus for measuring the propagation time of waves along a path by the use of frequency or phase-modulated waves. The invention has particular reference to ultrasonic waves such as are employed in the non-destructive testing of materials to detect hidden flaws; however, the invention is equally applicable to other arrangements in which the propagation time of waves is measured, such as in radar and sonar.

In order to measure the location of a target by the use of ultrasonic or radio frequency energy, the propagation time of waves from a source of energy to the target and back to the source is usually measured to provide an indication of the distance of the target from the source of energy. Usually the signals are pulse or frequency-modulated so that the reflected signals can be distinguished from one another and from the signals which are being emitted from the source.

Pulse modulation has been widely used because it provides discrete pulses of energy of a constant frequency, and the propagation time of such pulses is easy to measure. Pulse modulation has the disadvantage that large amounts of power are required due to the low duty cycle of the pulses.

Frequency-modulated arrangements require relatively less power because they have a large duty cycle. In such arrangements, the frequency of the signal which is produced by the source of energy is varied or swept periodically over a certain frequency range. The reflected energy sweeps through the same frequency range as the original signal, but the instantaneous frequency of the reflected energy is different from the instantaneous frequency of the signal then being produced by the source because of the time required for the reflected energy to travel to and from the target.

Ordinarily the reflected signal which is received is mixed with the frequency-modulated signal which is then being produced by the source to provide a heterodyne or beat note signal having a frequency which is equal to the difference between the instantaneous frequencies of the received signal and the signal which is then being produced by the source. The frequency of the heterodyne signal is determined by the propagation time of the reflected signal, and hence it provides a measure of the distance from the source of energy to the target. The distance is ordinarily measured by using a frequency meter to measure the frequency of the heterodyne signal.

It is difficult to use such arrangements to detect multiple targets because precise control of the linearity of the frequency modulation is required in order to obtain good range resolution.

This difficulty is overcome in the present invention by providing two waves in time sequence having frequencies which vary or sweep periodically in substantially the same manner, with the sound wave starting at a later time and being offset in frequency from that of the first wave. One or both of the waves may be transmitted from the source to the reflecting target, and the reflected waves are mixed with one or both of the waves which are then being produced by the source. An indicator arrangement provides an indication of the occurrence of heterodyne signals having a certain frequency.

The propagation time of the wave may be measured (1) by adjusting the time at which the offset in frequency occurs between two waves, (2) by adjusting the amount of the frequency offset between the two waves, (3) by adjusting the distance between the source of the waves and the target until the heterodyne signals have the frequency at which the indicator arrangement responds, (4) by the use of tunable or multiple filters, or (5) by any combination of items (1), (2), (3), and (4).

Preferably the parameter which is adjusted is varied periodically and a cathode-ray tube is employed in the indicator with the trace of the cathode-ray tube being swept in synchronism with the periodical variations of the parameter so as to provide a conventional cathode-ray tube indication of the distance to the target.

Although I prefer to employ frequency-modulated waves, it will be apparent that phase-modulated waves may be employed if desired.

The invention is explained in detail with reference to the drawings, in which:

Fig. 2 illustrates the wave forms of the signals which are produced in the apparatus of Fig. 1;

Fig. 3 is a diagram illustrating a modification of the apparatus of Fig. 1;

Fig. 4 is a circuit diagram showing another embodiment of the invention;

Figs. 8 and 9 are circuit diagrams showing further embodiments of the invention.

Figure 1:
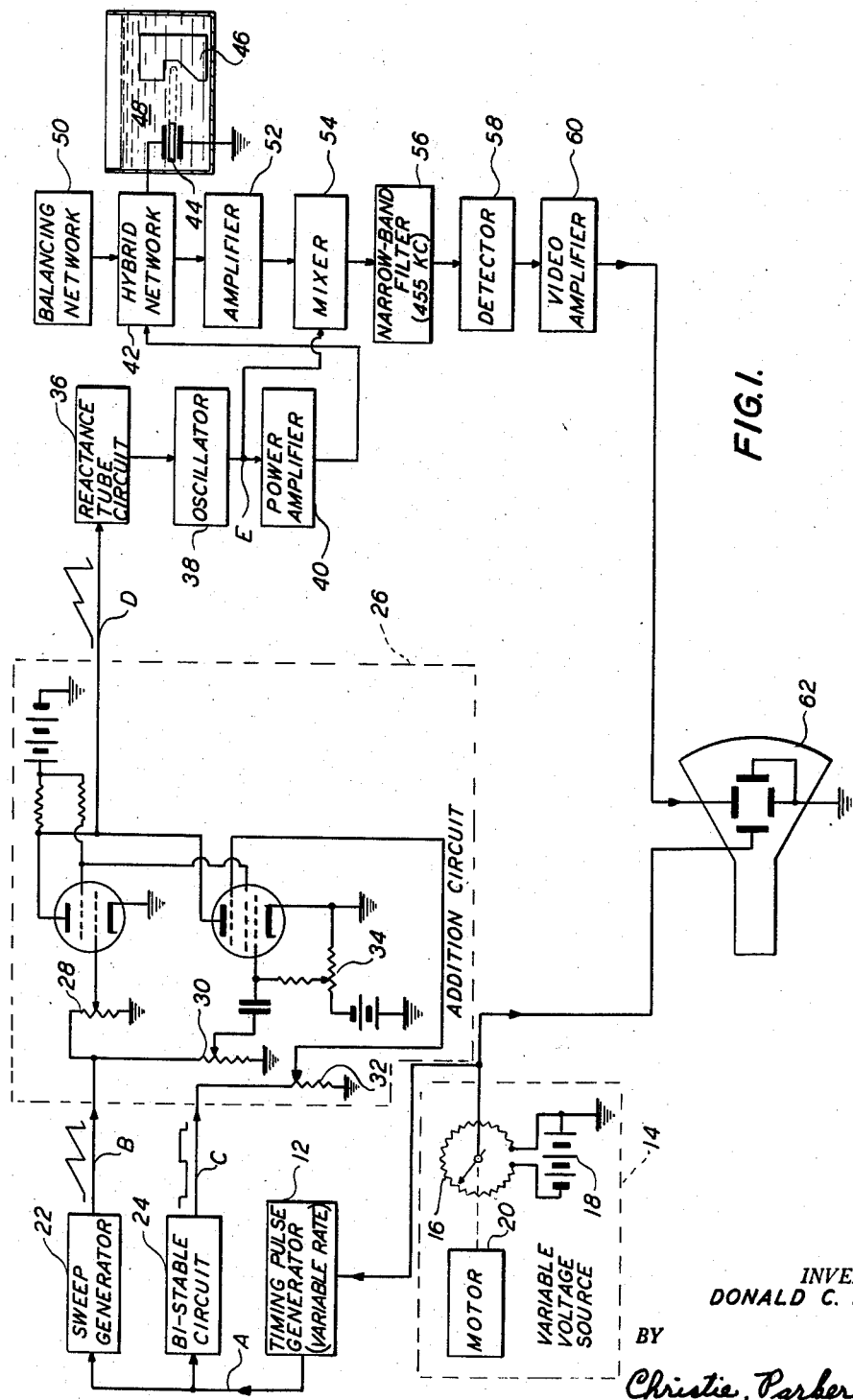
Fig. 1 is a diagram illustrating one embodiment of the invention.

Fig. 1 shows an embodiment of the invention in which two frequency-modulated waves are transmitted in time sequence to the target, and both of the waves are employed to provide the reflected signals and the signals for mixing with the reflected signals to produce heterodyne signals. The second wave starts at a later time and it is offset in frequency from the first wave. The time at which the offset in frequency occurs is varied in order to measure the propagation time of the waves.

A timing pulse generator 12 provides a series of equally spaced pulses A (see Fig. 2) which control the sequence of operations in the apparatus. The timing pulse generator is a variable repetition rate type, and the rate or periodicity of the pulses is controlled by the voltage which is produced by a variable voltage source 14. The variable voltage source 14 may comprise a potentiometer 16 which is connected across a source of potential 18 and which is driven by a motor 20, as illustrated in Fig. 1, or it may be a conventional electronic sweep generator which provides periodic voltage excursions.

The timing pulses A are applied to a sweep generator 22 and to a bi-stable circuit 24. The sweep generator produces voltage excursions B having sawtooth wave form in synchronism with the timing pulses A. The bi-stable circuit produces signals C of rectangular wave form in synchronism with the voltage excursions B.

The sawtooth signals B and the rectangular signals C are applied to a gated adder circuit 26 where they are summed to provide an output signal D of sawtooth wave form wherein the adjacent voltage excursions start from and follow different voltage levels. Preferably the addition circuit is provided with a pair of potentiometers 28 and 30 for adjusting the slopes of the respective voltage excursions, and with a pair of potentiometers 32 and 34 for adjusting the amount of offset in the voltage excursions.

The output signal is applied to a reactance tube circuit 36. The output of the reactance tube circuit is applied to an oscillator 38, and it serves to cause the oscillator to produce two waves which occur in time sequence and which have frequencies which vary or sweep periodically in the same manner in synchronism with the voltage excursions of the signals D which are produced by the addition circuit. The second wave (in time) is offset in frequency from the first wave an amount which is proportional to the offset in the voltage excursions D.

The output signals E of the oscillator are applied through a power amplifier 40 and a hybrid network 42 to a crystal transducer 44 which serves to transmit and receive ultrasonic signals. In order to illustrate the invention, the transducer 44 and a target 46 are shown immersed in a liquid 48. The liquid serves to convey the ultrasonic waves with much greater efficiency than would be possible in air.

A balancing network 50 is connected to the hybrid network. The hybrid network and its balancing network are adjusted so that substantially all the ultrasonic energy which is produced at the output of the power amplifier is applied through the hybrid network to the transducer 44, and so that substantially none of this signal is fed to the amplifier 52 and the mixing arrangement which follows it. The hybrid network and its balancing network are arranged to convey substantially all of the reflected energy which is received by the transducer 44 to the amplifier 52. The hybrid network may be of any conventional type such as the antiside tone circuit used in telephony. In radar arrangements which employ ultra-high-frequency energy, the hybrid network may be a magic T circuit.

The echo signals which are received by the transducer 44 are applied through the hybrid network 42 and the amplifier 52 to a mixer 54. The output of the oscillator 38 is also applied to the mixer 54 so that the received waves are mixed with the waves which are then being produced to provide heterodyne signals.

The output of the mixer is applied through a band-pass or narrow-band filter 56 to a detector 58. The filter 56 may be arranged to pass heterodyne signals having any desired frequency. By way of example, the filter 56 may be tuned to pass signals having a frequency of 455 kilocycles. Such filters are readily available because they are conventional types.

The detected signal is amplified by a video amplifier 60 and applied to one set of the deflection plates of a cathode-ray tube 62. The variable voltage which is produced by the source 14 is applied to the other set of the deflection plates of the cathode-ray tube. Such a deflection arrangement provides an A-type scan so that the location of the detected signal along the horizontal axis of the cathode-ray tube provides a measure of the distance to the target.

The distance to the target is also indicated by the time between the pulses which are produced by the timing pulse generator at the instant when a signal appears on the screen of the cathode-ray tube. If desired, the signal which is produced by the variable voltage source 14 may be adjusted manually and the distance to the target may be ascertained by observing the manual setting of the voltage source when a signal is produced on the screen of the cathode-ray tube. However, it is preferable that the signal which is produced by the source 14 be varied cyclically, as indicated in Fig. 1, so that plural reflecting surfaces may be indicated during each cycle of operation.

In the apparatus of Fig. 1, each time that a reflected signal is received at the same time that the offset in frequency between the two frequency-modulated waves occurs, a heterodyne signal having a beat frequency equal to that to which the filter 56 is tuned may be produced as illustrated by the wave forms E of Fig. 2. The time $t_e$ at which the echo signals occur is equal to the time $t_j$ at which the offset in frequency between the two waves occurs. In the example shown in Figs. 1 and 2, the beat note will have a frequency of 455 kilocycles, as illustrated by the shaded portion between the echo signals and the signals E. This beat note will be passed by the filter 56 to provide an indication on the screen of the cathode-ray tube.

The wave form E' of Fig. 2 illustrates the condition of operation wherein the time $t_e$ at which the echo occurs does not coincide with the time $t_j$ at which the offset in frequency between the two waves occurs. For this condition, the heterodyne signals have a frequency which is different from that to which the filter 56 is tuned, and hence no indication will be provided on the screen of the cathode-ray tube.

Instead of controlling the time $t_j$ at which the offset in frequency between the two frequency-modulated waves occurs, the amount of offset in frequency between the two waves may be adjusted in order to produce heterodyne signals of the desired frequency to be passed by the narrow-band filter. Fig. 3 shows how the apparatus of Fig. 1 may be modified so as to control the amount of offset in frequency between the two waves instead of controlling the time at which the offset in frequency between the two waves occurs. In this embodiment of the invention, a timing pulse generator 12' which operates at a fixed rate is employed to control the sequence of operations. The amount of offset in frequency between the two waves is adjusted by a potentiometer 64 which serves to control the amplitude of the rectangular waves which are applied to the addition circuit 26. The potentiometer 64 may be varied cyclically by the motor 20, as illustrated in Fig. 3, or it may be adjusted manually if desired. Preferably, the potentiometer 64 is varied in synchronism with the signals which deflect the beam of the cathode-ray tube. This may be achieved by synchronizing the operation of the potentiometers 16 and 64, as illustrated in Fig. 3.

Fig. 4 illustrates an alternative embodiment of the invention in which the time at which the offset in frequency between the two frequency-modulated waves occurs is varied. This embodiment of the invention is similar to that of Fig. 1, except that the hybrid network, the balancing network, and the mixer circuit are omitted. A variable-gain power amplifier 66 is coupled between the oscillator 38 and the transducer 44, and the gain of the power amplifier is controlled in accordance with the signals C which are produced by the bi-stable circuit 24.

Figure 5:
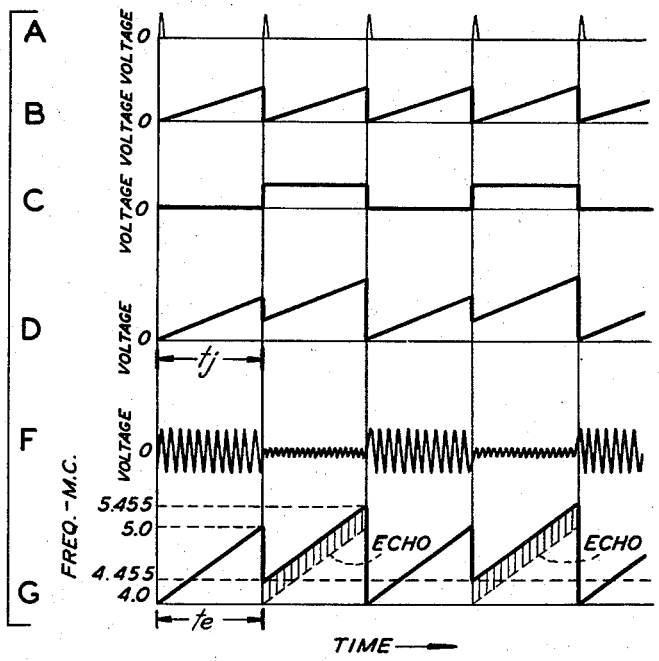
Fig. 5 illustrates the wave form of signals which are produced in the apparatus of Fig. 4.

As illustrated in the wave forms F of Fig. 5, the amplitude of the signal which is conveyed through the power amplifier 66 is reduced during alternate cycles of operation, and the wave of reduced amplitude is mixed with the echo signals in the amplifier 52 to provide heterodyne signals. The amplifier 52 in this embodiment of the invention should be a type which will not block when signals of large amplitude are applied to it.

The operation of the apparatus of Fig. 4 is illustrated in Fig. 5. When the time $t_e$ at which the echo occurs is equal to the time $t_j$ at which the offset in frequency between the two frequency-modulated waves occurs, a heterodyne signal will be produced having a beat frequency which will pass through the filter 56 so as to cause an indication on the screen of the cathode-ray tube 62. The shaded areas extending between the echo signals and the signals G represent the heterodyne signals which are produced for this condition of operation.

Figure 6:
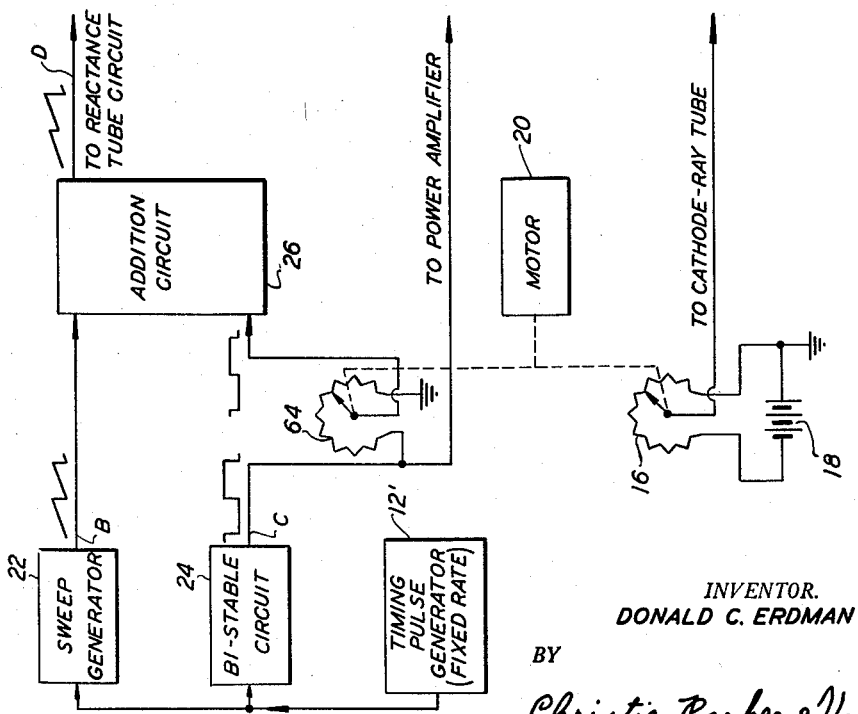

Fig. 6 illustrates how the apparatus of Fig. 4 may be modified so as to vary the amount of offset in frequency between the two frequency-modulated waves instead of the time at which the offset in frequency between the two waves occurs. This modification of the invention is similar to that discussed above with reference to Fig. 3 in that the amplitude of the rectangular waves C is varied in order to vary the amount of offset in frequency.

Figure 7:
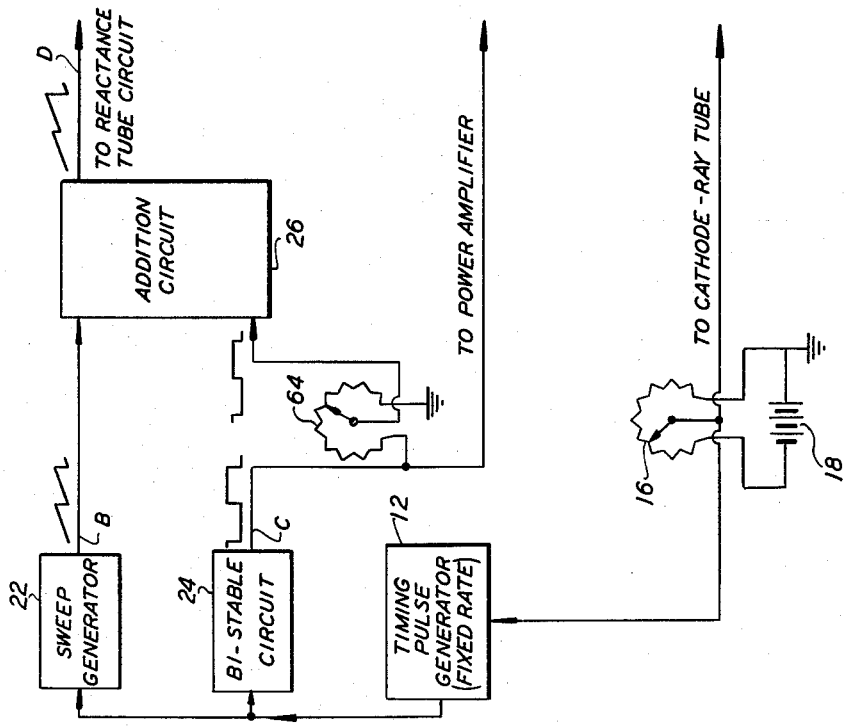
Figs. 6 and 7 are circuit diagrams showing modifications of the apparatus of Fig. 4.

Fig. 7 illustrates how the apparatus of Fig. 4 may be modified so as to vary both the time at which the offset in frequency of the two frequency-modulated waves occurs and the amount of offset in frequency between the two waves. In this embodiment of the invention, the time at which the offset in frequency occurs is controlled by the setting of the potentiometer 16, and the amount of offset in frequency between the two waves is controlled by the potentiometer 64.

Figure 8:
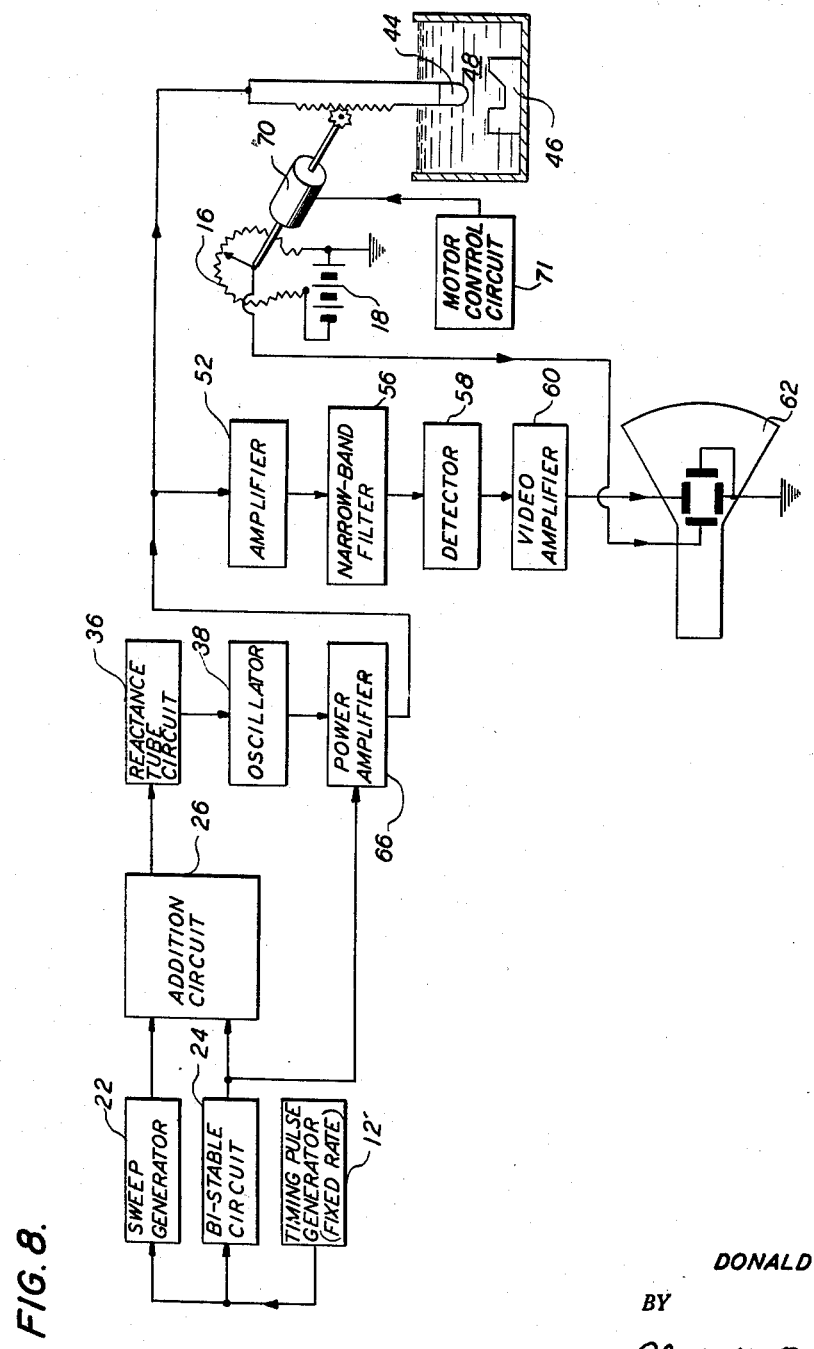

Fig. 8 illustrates an embodiment of the invention in which the time at which the offset in frequency between the two frequency-modulated waves and the amount of offset in frequency between the two waves is maintained constant, and the location of the transducer is adjusted to vary the length of the path along which the waves are propagated.

In this embodiment of the invention, the location of the transducer 44 is controlled by a motor 70, and the time at which the echo signals are received may be controlled in this manner. A motor control circuit 71 causes the motor to run first in one direction and then in the opposite direction for predetermined periods of time so as to move the transducer 44 up and down periodically. The sweep of the trace of the cathode-ray tube 62 is controlled by a potentiometer 16 which is also actuated by the motor 70 so that the trace of the cathode-ray tube is moved in synchronism with movement of the transducer 44.

When the transducer is positioned so as to cause an echo signal which occurs at the same time that the offset in frequency occurs between the two frequency-modulated waves which are produced by the oscillator 38, a heterodyne signal having a frequency which will be passed by the filter 56 is produced. This signal is detected and applied through the video amplifier 60 to produce an indication on the screen of the cathode-ray tube at a location which corresponds to the location of the portion of the target 46 that produced the echo signal.

It will be apparent that variation in the length of the propagation path is all that is required to practice the technique which is illustrated in Fig. 8. This may be achieved by moving the target as well as by moving the transducer.

Although the apparatus of Figs. 1 to 8 has been discussed with particular reference to use at ultrasonic frequencies, it will be apparent that these embodiments of the invention may be employed at radio frequencies if desired. Fig. 9 illustrates one way in which the techniques of the present invention may be employed in a radar system.

In this embodiment of the invention, a variable rate timing pulse generator 80 provides separate trains of pulses H and I for controlling the sequence of operations. The pulses H are applied to a sweep generator 82 which produces voltage excursions J having sawtooth wave form. The signals J are applied to a reactance tube circuit 84, and the output of the reactance tube circuit is employed to control the frequency of the signals which are produced by an oscillator 86. The output signals M of the oscillator 86 are applied to a radio transmitter 88 which transmits the radio frequency waves from an antenna 90.

The reflected waves are received by an antenna 92 and applied through a radio frequency amplifier 94 to a mixer 54.

Figure 10:
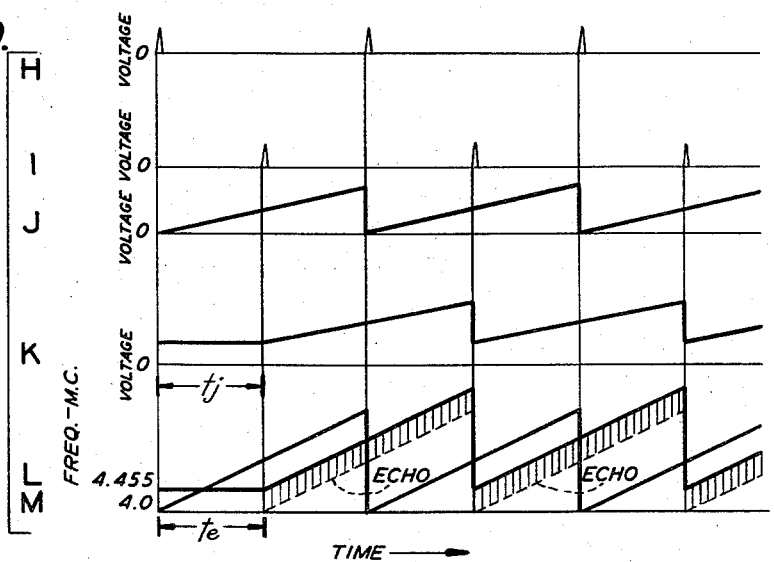
Fig. 10 illustrates the wave form of signals which are produced in the apparatus of Fig. 9.

The pulse signals I are applied to another sweep generator 95 which produces voltage excursions K which start at a higher level than the voltage excursions J. The signals K are applied to a reactance tube circuit 96 which controls the frequency of the signals which are produced by an oscillator 98. The oscillator 98 provides signals L to the mixer circuit. When the time $t_e$ at which the echo occurs is the same as the time $t_1$ at which the signals K are initiated, a beat note is produced having a frequency which will be passed by the filter 56. The beat note is illustrated by the shaded area between the echo signals and the signals L of Fig. 10. This signal is detected by the detector 58, amplified by the video amplifier 60 and applied to an electrode in the cathode-ray tube for intensifying the trace of the cathode-ray tube.

The angular position of the antennas 90 and 92 is controlled by a motor 99. A potentiometer 100 is coupled to the motor 99 to provide a voltage representative of the angular position of the antennas. The output of the potentiometer 100 is applied to one set of the deflection plates of the cathode-ray tube. The output of the variable voltage source 14 is coupled to the other set of deflection plates for the cathode-ray tube so as to provide a B-type scan, such as employed in conventional radar sets.

It will be apparent that the signal frequencies which are passed by the band-pass or narrow-band filters 56 of the various embodiments of the invention may be adjustable if desired. This may be achieved by the use of tunable filters or by the use of multiple filters tuned to different frequencies which are selected by a suitable switching arrangement. Such tunable or multiple filter arrangements may be employed to provide a measure of the distance to a target since the frequency of the heterodyne signal varies in accordance with the distance to the target.

Although linear frequency modulation has been illustrated in the drawings for the various embodiments of the invention, frequency modulation having other waveshapes, such as sinusoidal, may be employed provided the two frequency-modulated waves vary or sweep in substantially the same manner.

The techniques of the present invention have been described with reference to frequency modulation. These techniques are equally applicable to phase modulation arrangements, and the term frequency modulation as used in the disclosure and claims is intended to include the special case where the frequency modulation is of low order and thus comes within the general usage of the term phase modulation. Also, the term frequency modulation as used in the disclosure and claims includes the special case where the frequency or phase modulation is zero.

The term propagation time as used in the specification and claims designates the time required for waves to travel from a source, such as a transducer to a target and then to a receiving location. Ordinarily the source and the receiving device are at the same location so that the waves travel from the source to the target from which they are reflected to the receiving device. The same transducer may be employed to transmit and receive the waves, or separate transducers may be employed. In the latter case the transducers may be located adjacent one another, or they may be spaced apart.

I claim:

1. Apparatus for determining the propagation time of ultrasonic waves along a path, comprising an oscillator, means coupled to the oscillator for causing it to produce two waves in time sequence having frequencies which vary periodically in substantially the same manner with the second wave starting at a later time and being offset in frequency from that of the first wave, a variable gain amplifier coupled to the output of the oscillator, a transducer coupled to the output of the amplifier for transmitting and receiving ultrasonic signals, means coupled to the amplifier for reducing the gain of the amplifier during the periods of time when the second waves are applied to it, means coupled to the transducer for mixing the received waves with the second waves which are then being produced to provide heterodyne signals, and means coupled to the mixing means for providing an indication of heterodyne signals having a predetermined frequency.

2. Apparatus for determining the propagation time of ultrasonic waves along a path, comprising a timing pulse generator, a sweep generator coupled to the timing pulse generator for producing voltage excursions having sawtooth waveform in synchronism with the pulses produced by the timing pulse generator, a bi-stable circuit coupled to the timing pulse generator for producing signals of rectangular waveform in synchronism with the voltage excursions of sawtooth waveform, an addition circuit coupled to the output circuits of the sweep generator and the bi-stable circuit for providing an output signal of sawtooth waveform wherein the successive voltage excursions start from and follow different voltage levels, oscillator means coupled to the output of the addition circuit for producing two waves in time sequence having frequencies which vary periodically in substantially the same manner in synchronism with the voltage excursions which are produced by the addition circuit, with the second wave starting at a later time and being offset in frequency from that of the first wave, an amplifier coupled to the output of the oscillator means, a transducer coupled to the output of the amplifier for transmitting and receiving ultrasonic signals, a mixing circuit coupled to the transducer for mixing the received waves with the waves which are then being produced to provide heterodyne signals, and means coupled to the mixing means for providing an indication when the heterodyne signals have a predetermined frequency.

3. The apparatus of claim 2 wherein a hybrid network is connected between the transducer and the amplifier and the mixing circuit.

4. The apparatus of claim 2 wherein the output of the bi-stable circuit is coupled to the amplifier to reduce the gain of the amplifier in synchronism with the occurrence of the second waves.

5. The apparatus of claim 2 wherein the frequency of the pulses which are produced by the timing pulse generator is varied periodically to vary the time at which the offset in frequency occurs.

6. The apparatus of claim 2 wherein the amount of offset in frequency between the two waves is varied periodically.

7. The appratus of claim 2 wherein the location of the transducer is varied periodically to vary the length of the path along which the waves are propagated.

8. Apparatus for determining the propagation time of waves along a path, comprising means for producing two waves in time sequence which vary periodically in substantially the same manner with the second wave starting at later time than the first wave and being offset in frequency from that of the first wave, means for transmitting at least one of the waves along said path, means for receiving the waves which are reflected, means for causing the received waves to heterodyne with at least one of the waves which are then being produced to provide a signal having a certain heterodyne frequency when the received waves and the waves which are then being produced have a predetermined time relationship, said last-mentioned means including means for varying the path along which the waves are propagated to cause the received waves and the waves which are then being produced to provide a signal having the certain heterodyne frequency, and means for providing an indication of the heterodyne signals having a selected frequency.

9. The method of determining the propagation time of waves along a path which comprises the steps of producing two waves in time sequence which vary periodically in substantially the same manner with the second wave starting at a later time and being offset in frequency from that of the first wave, transmitting at least one of the waves along said path, receiving the waves which are propagated along the path, mixing the received waves with at least one of the waves which are then being produced to provide heterodyne signals, varying the length of the path along which the waves are propagated to cause the received waves and the waves which are then being produced to provide a signal having a predetermined heterodyne frequency, and providing an indication of the heterodyne signals having the predetermined frequency.

References Cited in the file of this patent

UNITED STATES PATENTS

| | | |
|---|---|---|
| 2,419,527 | Bartelink | Apr. 29, 1947 |
| 2,424,833 | Korman | July 29, 1947 |
| 2,474,918 | Slaymaker | July 5, 1949 |
| 2,522,367 | Guanella | Sept. 12, 1950 |
| 2,562,977 | Woodyard | Aug. 7, 1951 |
| 2,640,106 | Wilson | May 26, 1953 |
| 2,659,878 | Meeker | Nov. 17, 1953 |
| 2,821,702 | Russell | Jan. 28, 1958 |